United States Patent [19]
Hughes

[11] Patent Number: 5,968,174
[45] Date of Patent: Oct. 19, 1999

[54] METHOD AND APPARATUS FOR IMPLEMENTING A 32-BIT OPERATING SYSTEM WHICH SUPPORTS 16-BIT CODE

[75] Inventor: Earnest E. Hughes, San Antonio, Tex.

[73] Assignee: Bay Networkds, Inc., Santa Clara, Calif.

[21] Appl. No.: 09/045,349

[22] Filed: Mar. 19, 1998

[51] Int. Cl.$^6$ .................................................. G06F 9/445
[52] U.S. Cl. ............................................. 713/2; 713/100
[58] Field of Search .................................. 395/652, 700, 395/682, 650; 364/200; 713/1, 2, 100; 709/200, 221, 222; 710/10, 104, 200; 712/15

[56] References Cited

U.S. PATENT DOCUMENTS

| | | | |
|---|---|---|---|
| 4,799,145 | 1/1989 | Goss et al. | 364/200 |
| 4,835,677 | 5/1989 | Sato et al. | 364/200 |
| 5,134,580 | 7/1992 | Bertram | 395/650 |
| 5,136,711 | 8/1992 | Hugard et al. | 395/700 |
| 5,136,713 | 8/1992 | Bealkowski et al. | 395/700 |
| 5,257,380 | 10/1993 | Lang | 395/700 |
| 5,432,935 | 7/1995 | Kato et al. | 395/700 |
| 5,586,327 | 12/1996 | Bealkowski et al. | 713/2 |
| 5,680,547 | 10/1997 | Chang | 709/200 |
| 5,692,190 | 11/1997 | Williams | 713/2 |
| 5,734,904 | 3/1998 | Kanamori et al. | 395/685 |
| 5,758,124 | 5/1998 | Ogata et al. | 395/500 |
| 5,764,985 | 6/1998 | Smale | 395/682 |
| 5,835,760 | 11/1998 | Harmer | 713/2 |

*Primary Examiner*—Joseph E. Palys
*Assistant Examiner*—RiJue Mai
*Attorney, Agent, or Firm*—Blakely, Sokoloff, Taylor & Zafman

[57] ABSTRACT

A method and apparatus for implementing a 32-bit operating system which supports 16-bit code includes loading basic input output system (BIOS) code into a base portion of a memory and loading first operating system code into the base portion. Second operating system code is then loaded into an extended portion of the memory and the second operating system code is allowed to overwrite the BIOS code and the first operating system code with data.

18 Claims, 7 Drawing Sheets

METHOD AND APPARATUS FOR IMPLEMENTING A 32-BIT OPERATING SYSTEM WHICH SUPPORTS 16-BIT CODE

BACKGROUND OF THE INVENTION

1. Field of the Invention

The present invention pertains to operating systems. More particularly, this invention relates to implementations of a 32-bit operating system which supports 16-bit code.

2. Background

Modern computer systems are typically made up of several different components, each performing a different function. These components include both a processor for executing instructions and a system memory which stores instructions to be executed by the processor as well as data manipulated by the processor when executing these instructions. The majority of modern processors trace their origins to an architecture referred to as "x86", older versions of which could access memory locations up to 1 megabyte (referred to as an address space of 1 megabyte). A software program written to use memory locations only up to 1 megabyte uses 16 bits for addressing and thus is typically referred to as "16-bit" code. Using 16 bits for addressing provides an address space of 65,536 bytes (64k bytes), thus, multiple "segments" of 64k bytes are used to access the full 1 megabyte.

More recently, processors have expanded to access more memory locations and execute 32- and 64-bit code. For example, many commercially available "x86" compatible processors execute 32-bit code, providing access to multiple segments of four gigabytes each, and typically up to 64 terabytes in all. However, a large amount of 16-bit code remains in existence. Although it is typically beneficial for a processor to execute 32-bit code, there are situations where it is desirable or necessary to use pre-existing 16-bit code. By way of example, many programs are written in 16-bit code so that they can be executed by, and thus sold to owners of, older or less-complex computer systems which only support 16-bit code. One example of such programs are device drivers, used to control access to specific hardware devices. However, rather than providing both 16-bit and 32-bit versions of the programs, it would be beneficial to provide a way to execute 32-bit code which can interact with 16-bit code, thereby allowing newer or more-complex computer systems to use the programs as well.

One solution to this problem is referred to as a "DOS extender". A DOS extender is an additional application that is executed by DOS and acts as an interface between 32-bit applications and the 16-bit DOS. However, typically all communications between the 32-bit applications and 16-bit DOS are required to pass through the DOS extender—no direct communication between the 32-bit applications and 16-bit DOS is typically allowed. Additionally, a DOS extender is an application being executed by the computer system in addition to DOS, and thus increases memory and long-term storage space requirements of the device on which it is executed.

Additionally, the term "computer system" encompasses a wide range of modern computing devices, including conventional desktop PCs as well as less-complex systems. Many such less-complex systems are limited in the amount of memory they include, often in an effort to reduce costs. However, many modern operating systems use a large amount of memory and require a large amount of storage space. Thus, it would be beneficial to provide a relatively small operating system which could be used in such less-complex systems.

Thus, a need exists for an improved 32-bit operating system.

SUMMARY OF THE INVENTION

A method and apparatus for implementing a 32-bit operating system which supports 16-bit code is described herein. A method is described which includes the steps of loading both basic input output system (BIOS) code and first operating system code into a base portion of a memory. The method further loads second operating system code into an extended portion of the memory, and allows the second operating system code to overwrite the BIOS code and the first operating system code in the base portion of memory with data.

According to one embodiment, the loading of the second operating system code includes the first operating system code loading the second operating system code into the base portion of the memory. The first operating system code then initiates execution of an operating system initialization program, and the operating system initialization program transfers the second operating system code into the extended portion of the memory.

According to one embodiment, the second operating system loads at least one terminate and stay resident (TSR) application code which is executed in 16-bit protected mode into the base portion of memory, and also loads network application code which is executed in a 32-bit protected mode into the extended memory.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
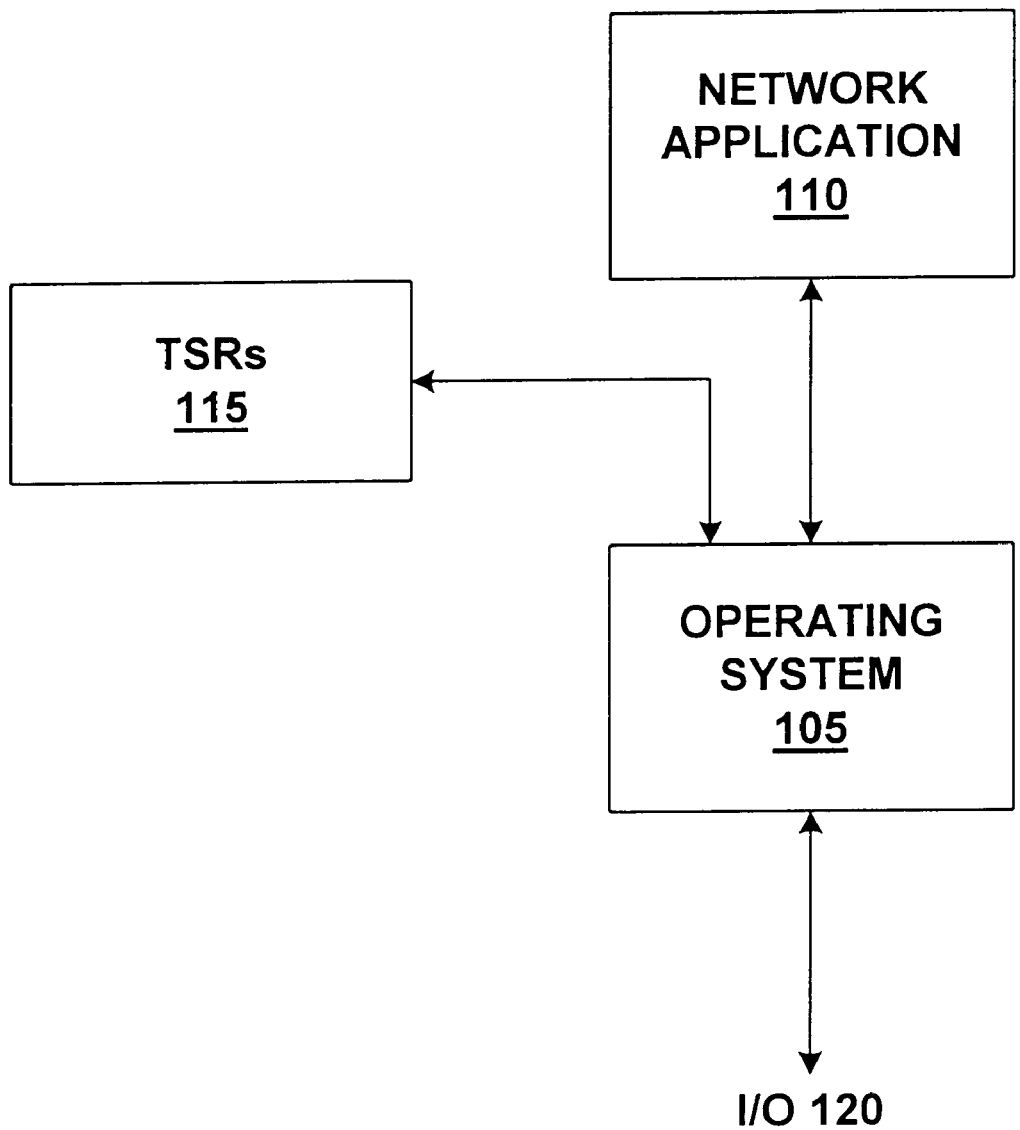
FIG. 1 illustrates a software architecture in accordance with one embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 illustrates a software architecture in accordance with one embodiment of the present invention. As illustrated in FIG. 1, software architecture 100 includes operating system 105, network application 110, and terminate and stay resident (TSR) modules 115. Input/output (I/O) 120 is provided to/from TSRs 115 and network application 110 via operating system 105.

Operating system 105 controls the execution of additional modules, including TSRs 115 and network application 110. Operating system 105, as discussed in more detail below, includes memory management functions as well as interface functions to allow the TSRs 115 and network application 110 to communicate with one another.

TSRs 115 control access to various hardware devices. Examples of TSRs include Ethernet drivers for controlling an Ethernet network adapter card, token ring drivers for controlling a token ring network adapter card, and NetBIOS drivers. According to one implementation, the following TSRs are used with the present invention: a Novell TSR manager (LSL), a Novell Ethernet driver (PCNTNW), and a Novell IPX protocol stack (IPXODI), all available from Novell, Inc. of Provo, Utah; an Olicom Token Ring driver (OCTOK16), available from Olicom, Inc. of Richardson, Tex.; and Bay Networks NetBIOS protocol stacks (NXIPX and NXODI), available from Bay Networks, Inc. of Santa Clara, Calif. Such TSRs are well-known to those skilled in the art and thus will not be discussed further except as they pertain to the present invention.

Any of a wide variety of software applications can be executed by operating system 105. It is to be appreciated that the specific software application(s) being executed are dependent on the nature of the system on which the software architecture 100 is executing.

In the illustrated embodiment, software architecture 100 is designed to be implemented in an Instant Internet[100]™ device, available from Bay Networks, Inc. of Santa Clara, Calif. Thus, in the illustrated embodiment, a network application 110 is executed by operating system 105. Network application 110 provides the various control functions for operating as a gateway to couple a local area network (LAN) to another network(s), such as the Internet, including maintaining connection information for multiple client systems coupled to the LAN to ensure that information received from the Internet (or other networks) is returned to the proper client system coupled to the LAN.

In the illustrated embodiment, network application 110 and operating system 105 are both implemented in x-bit code, while TSRs 115 are implemented in y-bit code. In one implementation, x equals 32 and y equals 16. In an alternate embodiment, network application 110, operating system 105, and TSRs 115 are all implemented in x-bit code.

Figure 2:
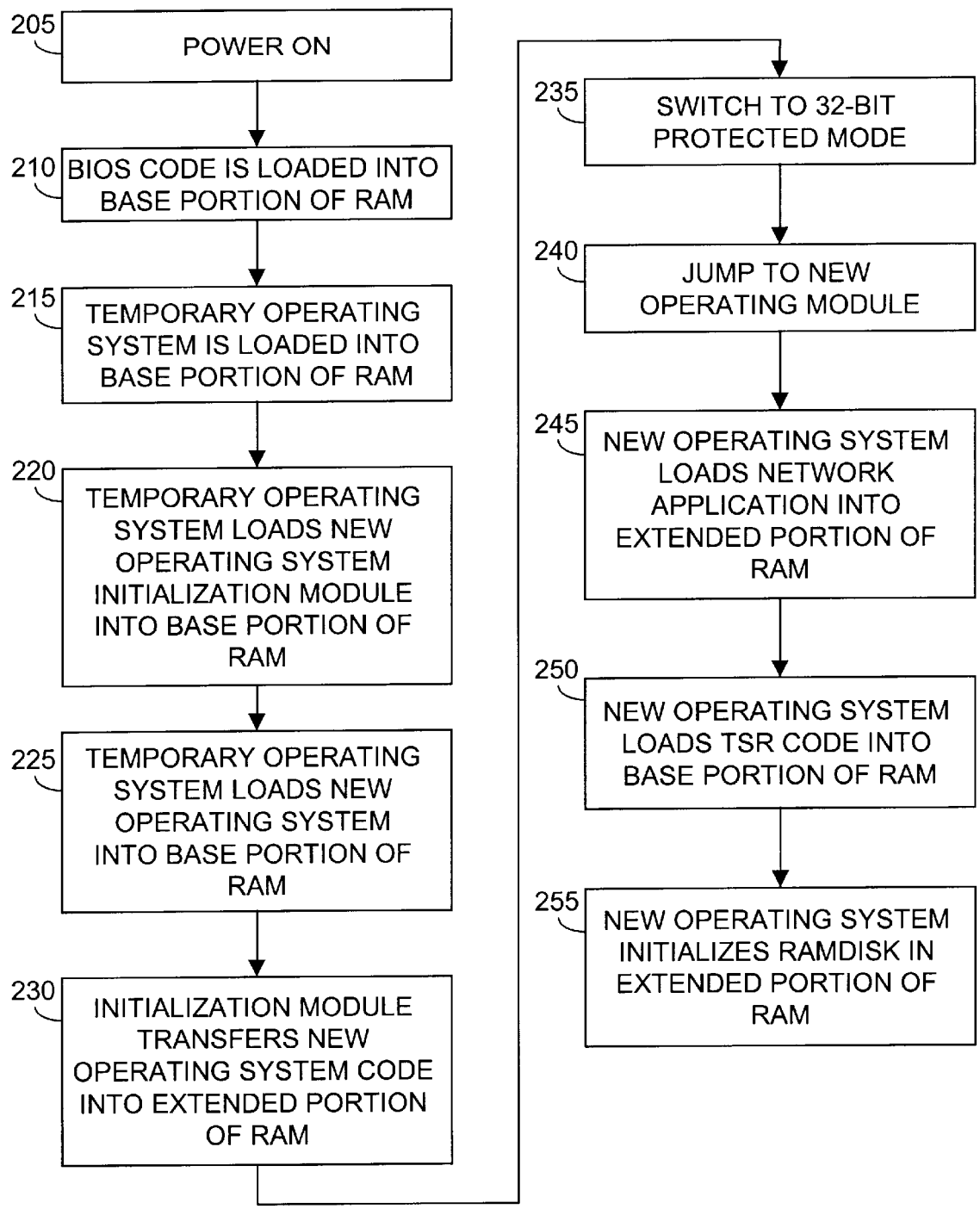
FIG. 2 is a flowchart illustrating the loading of a software architecture in a hardware system.
Figure 3:
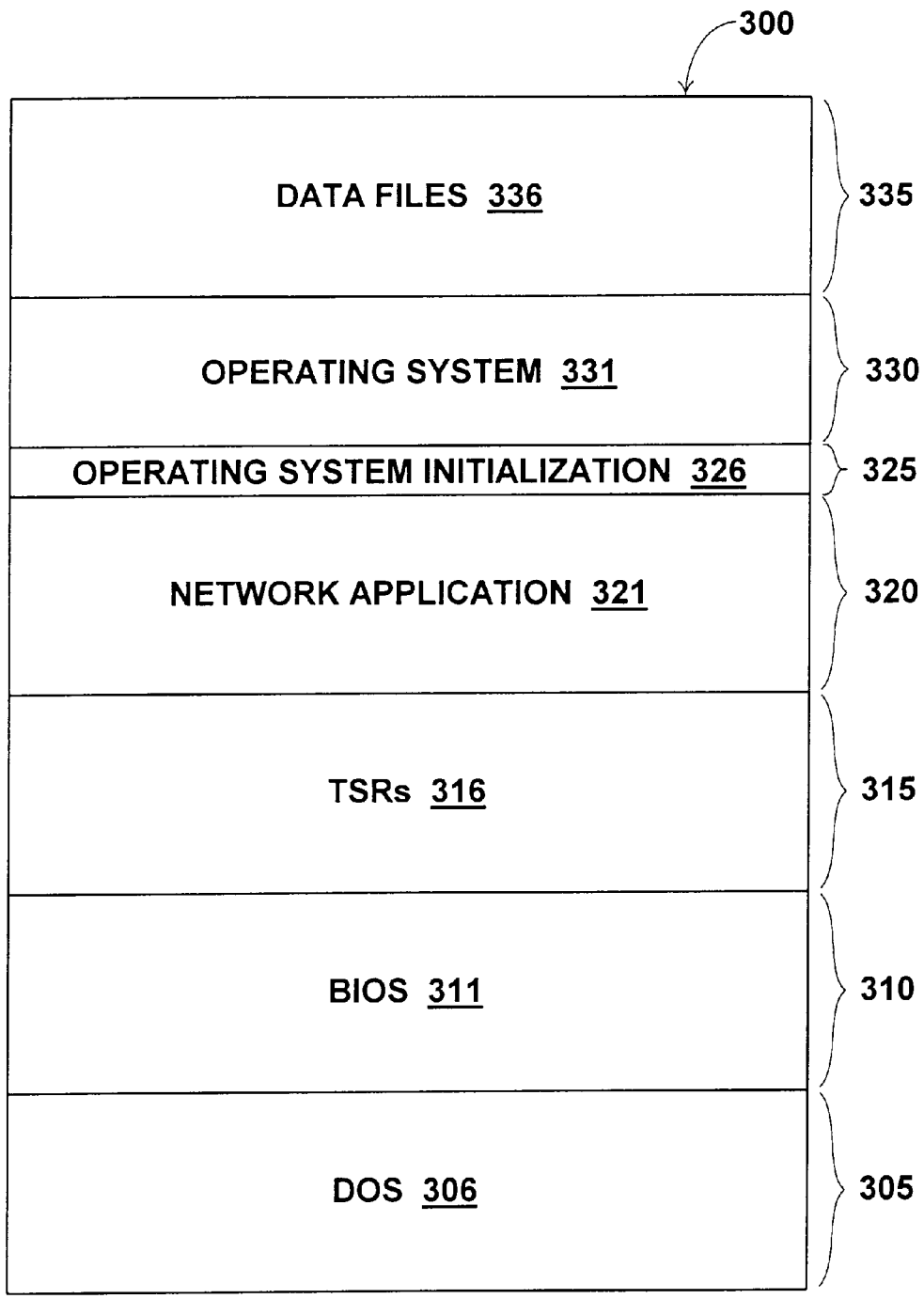
FIG. 3 illustrates a nonvolatile storage medium in accordance with one embodiment of the present invention.

FIG. 2 is a flowchart illustrating the loading of software architecture 100 in a hardware system. During the installation process, application code is transferred from a nonvolatile storage device, such as a Flash ROM, into system memory (RAM). The system is initially powered-on (e.g., by a user or automatically in response to an external event), step 205. Upon stabilization of the power supply, a basic input output system (BIOS) module is loaded into the base portion of RAM, step 210. The processor (not shown) of the hardware system is pre-configured to begin execution, in 16-bit real mode, of code at a predetermined location which corresponds to the beginning of the BIOS module in a nonvolatile storage medium, such as Flash ROM 300 of FIG. 3. The BIOS module code includes instructions which cause the processor to transfer the BIOS code 311 from the Flash ROM 300 to RAM, such as RAM 400 of FIG. 4. As illustrated in FIG. 3, a portion 310 of Flash ROM 300 includes the BIOS code 311.

Figure 4:
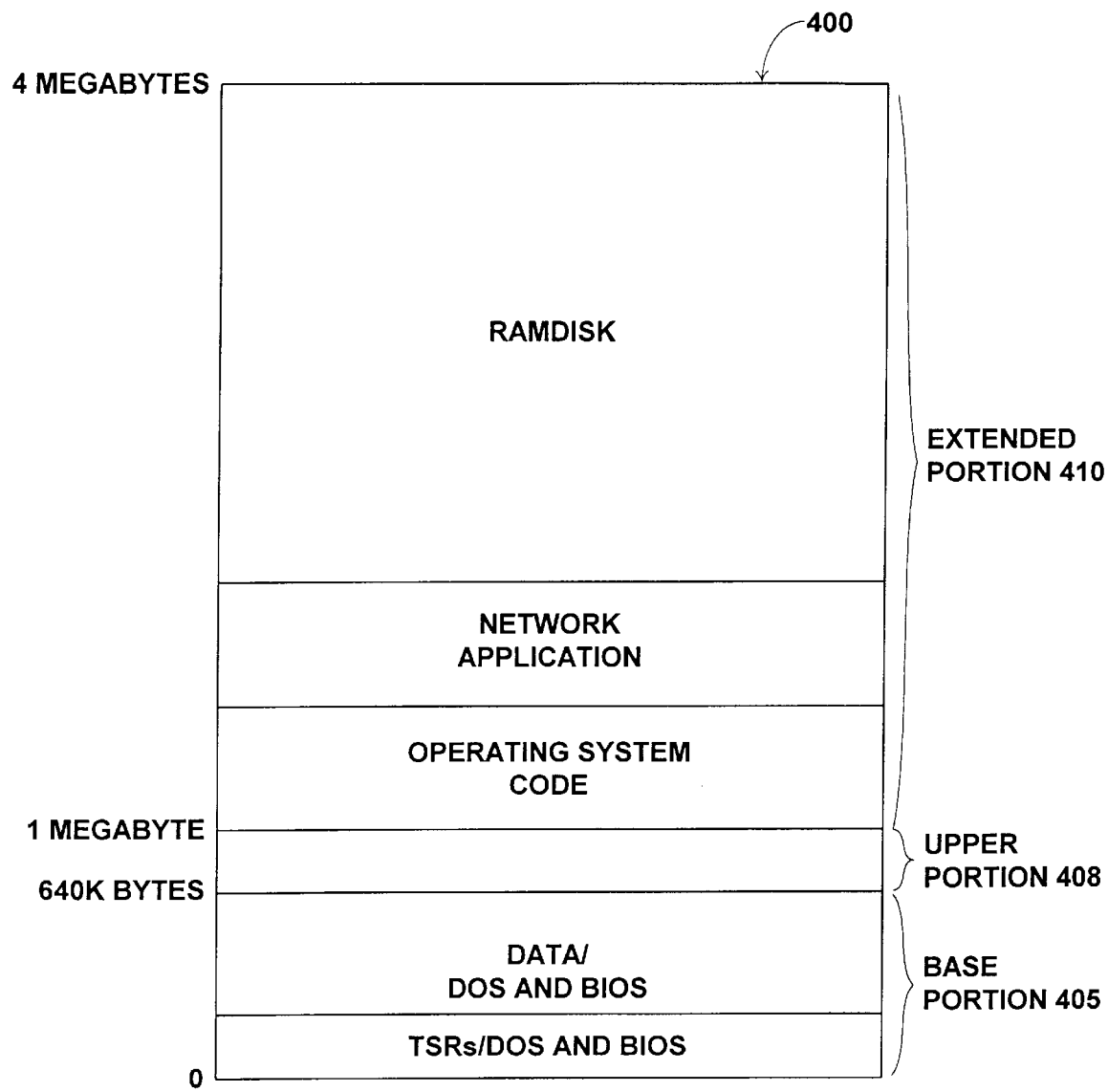
FIG. 4 illustrates a system memory according to one embodiment of the present invention.

As illustrated in FIG. 4, RAM 400 is separated into three portions, commonly referred to as base portion 405, upper portion 408, and extended portion 410. The base portion 405 refers to the first 640k bytes of RAM 400, the extended portion 410 refers to the memory from 1 Megabyte and higher (up to 4 Megabytes in the illustrated example), and the upper portion 408 refers to the 384k bytes of RAM 400 between the base portion 405 and extended portion 410. The BIOS code 311 is loaded into the base portion 405 of RAM 400 as illustrated in FIG. 4.

After loading the BIOS module code 311, one or more instructions in the BIOS code 311 causes a temporary operating system module, referred to as DOS, to be loaded, step 215. In the illustrated embodiment, the temporary operating system module is a Microsoft™ DOS-compatible operating system, such as ROM-DOS available from DataLight of Arlington, Wash. The temporary operating system module is loaded by transferring the DOS code 306 from a portion 305 of Flash ROM 300 (FIG. 3) to base portion 405 of RAM 400 (FIG. 4).

After loading of the temporary operating system module is completed, an instruction of the BIOS module code 311 causes the processor to jump to the temporary operating system code. Thus, the temporary operating system module begins executing and loads an initialization module for a new operating system, step 220. The temporary operating system may execute an external command (e.g., from a batch file) to load the initialization module code, or alternatively may be pre-programmed to load the initialization module code. The initialization module code for the new operating system is loaded by transferring the operating system initialization code 326 from a portion 325 of Flash ROM 300 (FIG. 3) to base portion 405 of RAM 400 (FIG. 4).

After loading the initialization module code 326, the temporary operating system loads the new operating system module, step 225. The new operating system module is loaded by transferring the new operating system code 331 from a portion 330 of Flash ROM 300 (FIG. 3) to base portion 405 of RAM 400 (FIG. 4). As this new operating system will be used for the continued operation of the device, it is also referred to as the "permanent" operating system.

After the new operating system code 331 is loaded, the initialization program switches to a 16-bit protected mode and transfers the new operating system module into extended memory, step 230. The final step of the initialization module is to switch to a 32-bit protected mode, step 235. It is to be appreciated that the specific commands to be carried out to switch to the 16-bit protected mode and the 32-bit protected mode are dependent on the specific processor which is executing the initialization module. According to one embodiment, the present invention is designed to operate with Intel®-compatible processors. Thus, the initialization module creates the page tables and establishes the interrupt and segmentation descriptor tables, and then switches to protected mode. The creation of the page tables and the interrupt and segmentation descriptor tables, as well as the switch to protected mode, is well known to those skilled in the art and thus will not be discussed further except as it pertains to the present invention. However, in alternate embodiments different steps are followed by the initialization module in accordance with the type of processor which is executing the steps of the present invention.

The initialization program then jumps to the new operating system module code, step 240, beginning execution of the new operating system module in 32-bit protected mode. The new operating system then copies the network application code 321 from portion 320 of Flash ROM 300 (FIG. 3) into extended portion 410 of RAM 400 (FIG. 4), step 245. As the new operating system code is executing in a 32-bit protected mode, it is able to load code (e.g., network application code 321) directly into extended portion 410 of RAM 400, which temporary operating system code 306 was unable to do.

The new operating system then copies the TSR code 316 from portion 315 of Flash ROM 300 into base portion 405 of RAM 400, step 250. The new operating system then initializes the remaining memory of extended portion 410 (that not used by the network application code or the new operating system code) to be used as a RAM disk, step 255. A RAM disk refers to RAM which is used to emulate a hard disk drive. Data and/or instructions can be stored to the RAM disk as if it were a hard disk, except that any data and/or instructions stored thereon are lost when the system is powered off. RAM disks are well-known to those skilled in the art and thus will not be discussed further except as they pertain to the present invention.

The loading of the network application (step 245) and the TSR code (step 250), as well as the initialization of the RAM disk (step 255) are carried out by the new operating system executing external commands, such as commands stored in a "batch" file. According to an alternate embodiment, the loading is carried out by commands pre-programmed into the new operating system.

As illustrated in FIG. 3, the code for each of the modules loaded into RAM is stored in one of the portions 305, 310, 315, 320, 325, and 330 of Flash ROM 300. Additionally, any data files 336 used by the modules during the initialization process of FIG. 2, as well as any data for network application 110 or TSRs 115 which is to be maintained after power down, are stored in Flash ROM 300 in portion 335.

As illustrated in FIG. 4, each of the modules from Flash ROM 300 are loaded into either base portion 405 or extended portion 410 of RAM 400. Initially, the temporary operating system and BIOS modules are loaded into base portion 405. However, after the new operating system module is loaded into extended portion 410 and begins execution, the temporary operating system and BIOS modules are no longer necessary. Thus, during the initialization process of FIG. 2 and subsequent operation, the new operating system module overwrites the temporary operating system and BIOS modules as memory space is needed for data and TSRs.

In the illustrated embodiment, network application code 412 in extended portion 410 is the code for network application 110 of FIG. 1. Similarly, operating system code 414 in extended portion 410 is the code for operating system 105 of FIG. 1, and the TSR code 415 in base portion 405 is the code for TSRs 115 of FIG. 1.

In the illustrated embodiment of FIG. 3, Flash ROM 300 is illustrated as being separated into multiple portions 305, 310, 315, 320, 325, 330, and 335. Each of these portions may be of different sizes, or alternatively may be the same size. It is to be appreciated that the size of a particular portion is dependent on the amount of code and/or data to be stored in that portion.

In the illustrated embodiment of FIG. 1, network application 110 and operating system 105 are both modules of 32-bit code, while TSRs 115 are modules of 16-bit code. According to one embodiment of the present invention, in order for network application 110 to communicate with TSRs 115, operating system 105 intercepts the calls to TSRs 115 from network application 110 and converts them from the 32-bit code format to the 16-bit code format expected by TSRs 115. Similarly, when TSRs 115 are finished responding to the calls, operating system 105 intercepts the TSRs 115 return to network application 110 and converts the return from the 16-bit code format of TSRs 115 to the 32-bit code format expected by network application 110.

Figure 5:
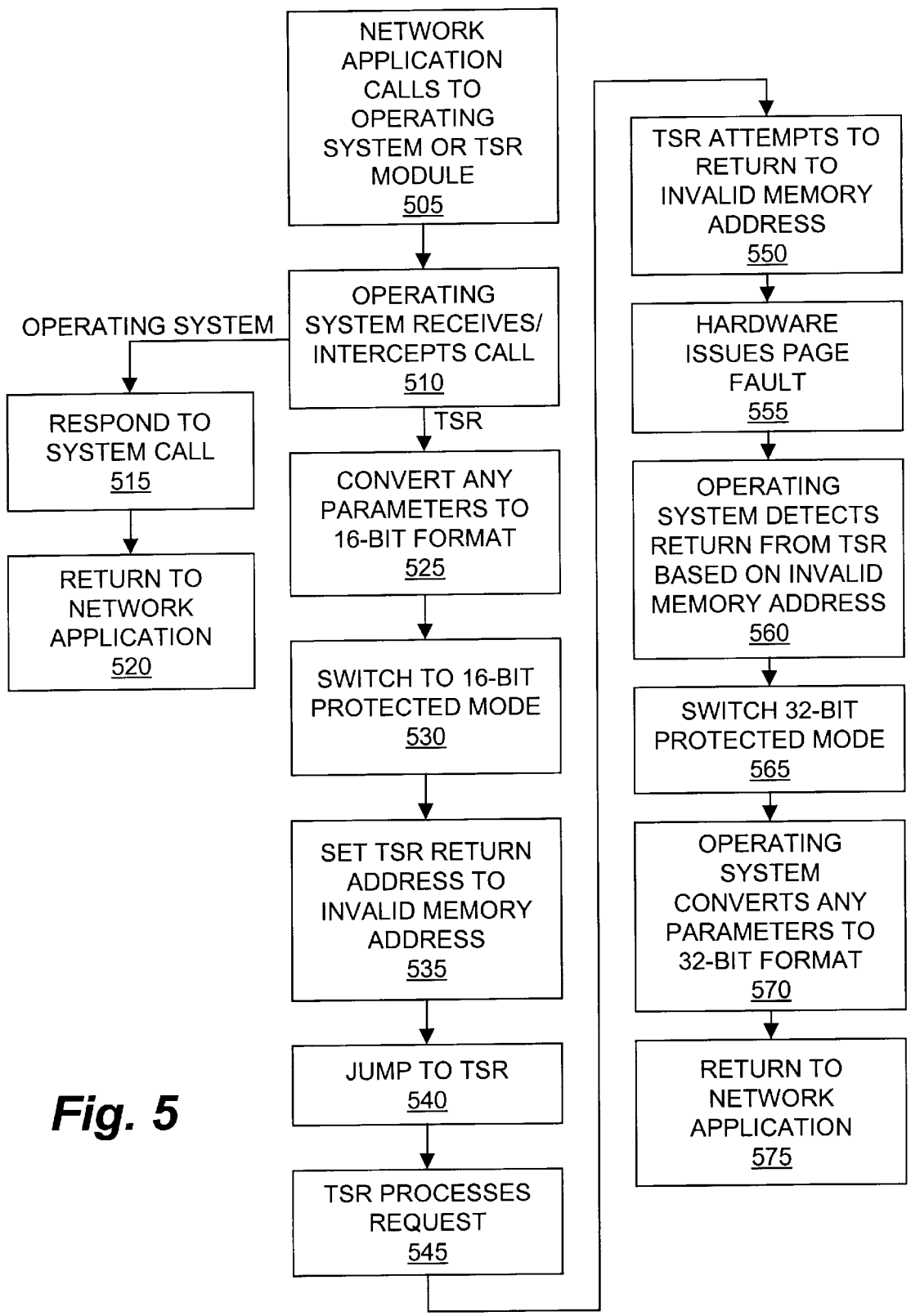
FIG. 5 is a flowchart illustrating the steps followed in interfacing between two types of code according to one embodiment of the present invention.

FIG. 5 is a flowchart illustrating the steps followed in interfacing between 16-bit code and 32-bit code according to one embodiment of the present invention. The network application initially executes a system call to either operating system 105 or one of TSRs 115, step 505. The operating system then either receives or intercepts the call, step 510. If the network application executes a system call to operating system 105, then the call is received by operating system 105 which carries out the necessary steps indicated by the system call, step 515. It is to be appreciated that the specific steps carried out by the operating system in response to the call are dependent on the specific system call which was made. The operating system then returns to the network application 520, thereby allowing the network application to continue being executed. Thus, whatever request(s) the network application has made by making the system call is carried out by the operating system 115.

However, if the network application executes a system call to one of the TSRs 115, then the call traps into the operating system. In the illustrated embodiment, the operating system is pre-programmed (e.g., pre-coded or provided with the information from data files 336 of FIG. 3), with the system calls which can be made to the TSRs 115. The operating system initializes these system calls to correspond to invalid 16-bit memory locations (e.g., memory locations above 1 Megabyte). This ensures that any such system call initiated by network application 110 causes a hardware trap, which in turn causes a trap handler of the operating system to begin executing. As the operating system "knows" which invalid 16-bit memory locations it assigned to which system calls, the operating system can readily identify the system call which was made by network application 100, as well as which TSR 115 the call was made to.

Operating system 105 then converts any necessary parameters (e.g., memory addresses) for the call to the 16-bit format, step 525. Any memory addresses, including paging and segmentation information, are converted so that the proper memory location is identified in a 16-bit format. An application typically passes in one of three ways: placing the parameters in registers, placing the parameters in a table(s) and placing a pointer to the table in a register, or placing the parameters on the stack. As the operating system 105 "knows" which system calls may be made by the network application, it also is preprogrammed with how each of the system calls is made, and thus where to obtain the parameters (if any) for the system call.

The operating system then switches to 16-bit protected mode, step 530. It is to be appreciated that the specific commands to be carried out to switch to the 16-bit protected mode is dependent on the specific processor which is executing the initialization module. According to one embodiment, using an Intel®-compatible processor, the operating system changes the processor state register (not shown) to 16-bit and modifies the stack pointer register for a 16-bit program. The implementation of such changes and modifications is well-known to those skilled in the art and thus will not be discussed further except as they pertain to the present invention. It is also to be appreciated that, in alternate embodiments, different steps may be taken in switching to 16-bit protected mode, based on the specific processor being used with the present invention.

A return address to be passed to the TSR is then set to be an "invalid" memory address (e.g., a memory location beyond its 64k byte segment) by the operating system 105, step 535. This ensures that, although the TSR 115 believes it received a request from the network application 110, a subsequent attempt to return to the network application is returned to the operating system 105 rather than the network application 110.

The operating system 105 then jumps to the appropriate TSR 115, step 540. As discussed above, the operating system 105 maintains a record (a table in one implementation) of system calls which can be made to the TSR 115. Given that the operating system 105 loaded the TSRs 115, it also knows the memory location where each resides. Thus, by comparing the system call to its record of possible system calls to TSRs, the operating system 105 can identify which TSR 115 was being called, and thus which address to jump to in order for the appropriate TSR (the TSR called by network application 110) to execute.

The TSR then processes the request, step 545, and upon completion attempts to return to the "invalid" 16-bit memory address provided by the operating system 105, step 550. Given that the 16-bit memory address is "invalid", the processor issues a page fault, step 555. This causes the operating system 105 to resume execution, and in turn detect the return from the TSR, step 560. As part of the page fault in step 555 the hardware provides the address which caused the fault to the operating system 105. Thus, the operating system 105 can recognize the address which caused the fault as the address which it had previously passed to the TSR.

The operating system then switches back to 32-bit protected mode, step 565, and converts any parameters received from the TSR to 32-bit format, step 570. The operating system then jumps to the network application 110, step 575, allowing the network application 110 to continue execution.

In the discussions above, reference is made to accessing TSRs 115 based on system calls from network application 110. It is to be appreciated that TSRs 115 may also be accessed in other manners (e.g., a hardware interrupt from a network interface controller). Parameters for any such accesses are similarly converted to a 16-bit format as necessary by the operating system 105.

Figure 6:
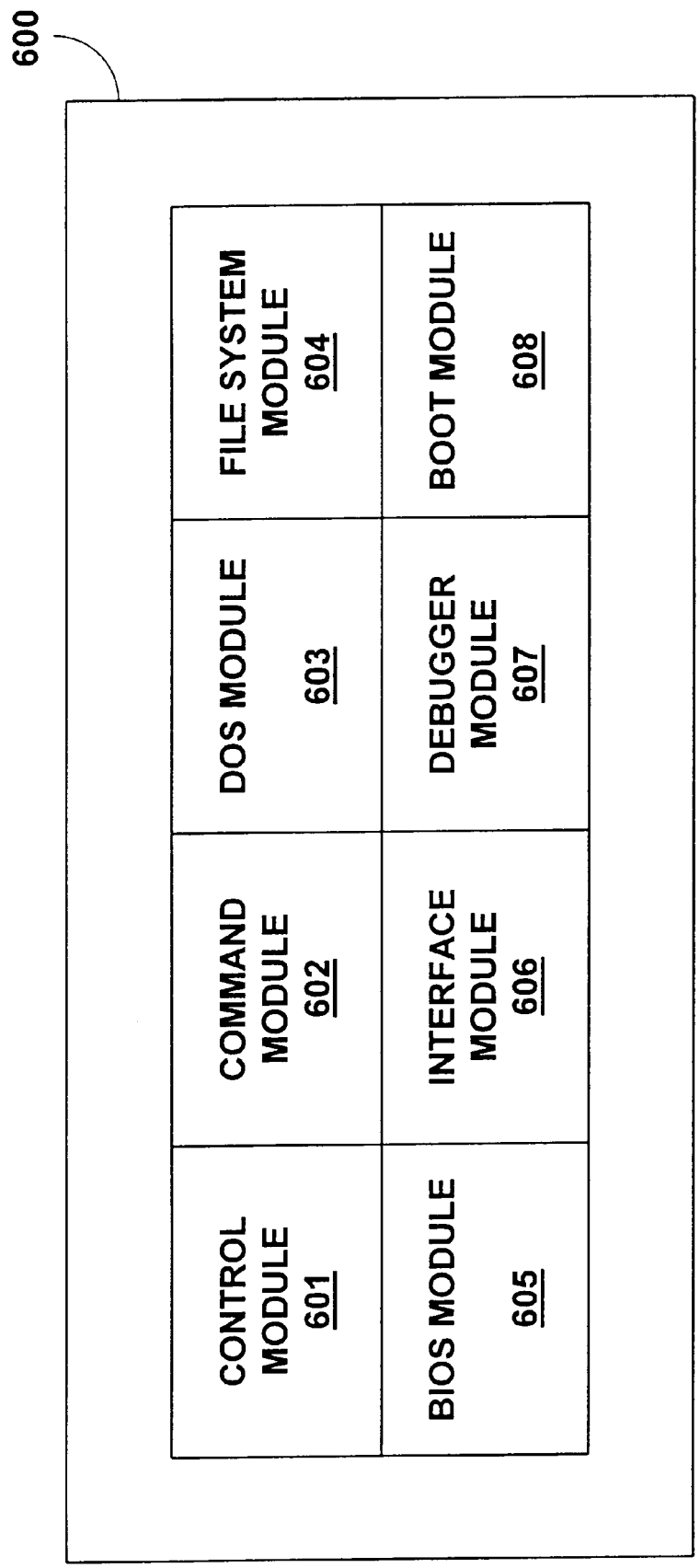
FIG. 6 is a block diagram illustrating an operating system according to one embodiment of the present invention.

FIG. 6 is a block diagram illustrating an operating system 600 according to one embodiment of the present invention. According to one implementation, operating system 600 is operating system 105 of FIG. 1. As illustrated, operating system 600 includes a control module 601, a command module 602, a DOS module 603, a file system module 604, a BIOS module 605, an interface module 606, a debugger module 607, and a boot module 608.

Boot module 608 includes the initialization program code (code 326 of FIG. 3), which loads the remainder of the operating system 600 into system memory. Boot module 608 also initiates the page tables used by the operating system in managing memory in the protected mode. The page tables (not shown) identify which logical memory addresses are usable by which applications, as well as which physical memory locations correspond to which logical memory addresses. The use of page tables is well-known to those skilled in the art and thus will not be discussed further except as it pertains to the present invention.

Control module 601 includes the code for processing interrupts, traps, and other regular errors, including page faults. Command module 602 includes a command interpreter for recognizing conventional Microsoft™ DOS-compatible commands which can be executed from a batch file.

DOS module 603 includes the code for identifying and processing Microsoft™ DOS-compatible system calls (e.g., time/date commands, memory allocation commands, keyboard commands, etc.). The file system module 604 includes the code for accessing storage devices, including Flash ROM 300 of FIG. 3, and a RAM disk in system memory 400 of FIG. 4, as well as other storage devices (not shown) and accesses to display devices (applications can write to a display device as if it were a file). The file system module 604 includes code for disk management, space allocation, creating files, opening files, deleting files, reading files, and writing files.

BIOS module 605 includes the code for processing conventional BIOS-level functions. Such functions include access to the hardware devices, e.g., system clock, system timers, video screen I/O, keyboard I/O, disk I/O, RAM disk I/O, Flash ROM I/O, etc. The BIOS module 605 works in conjunction with the file system module 604, as well as device drivers of TSRs 115 of FIG. 1 as necessary, to communicate with the hardware devices.

Interface module 606 includes the code for interfacing between 16-bit code and 32-bit code. Interface module 606 includes the code for processing the interception of system calls between 16-bit and 32-bit code, as well as the conversion of parameters between 16-bit and 32-bit code.

Debugger module 607 includes code for assisting in the debugging of operating system 600, as well as applications being executed by operating system 600. Any of a wide variety of conventional debugging operations can be incorporated into debugger module 607.

Figure 7:
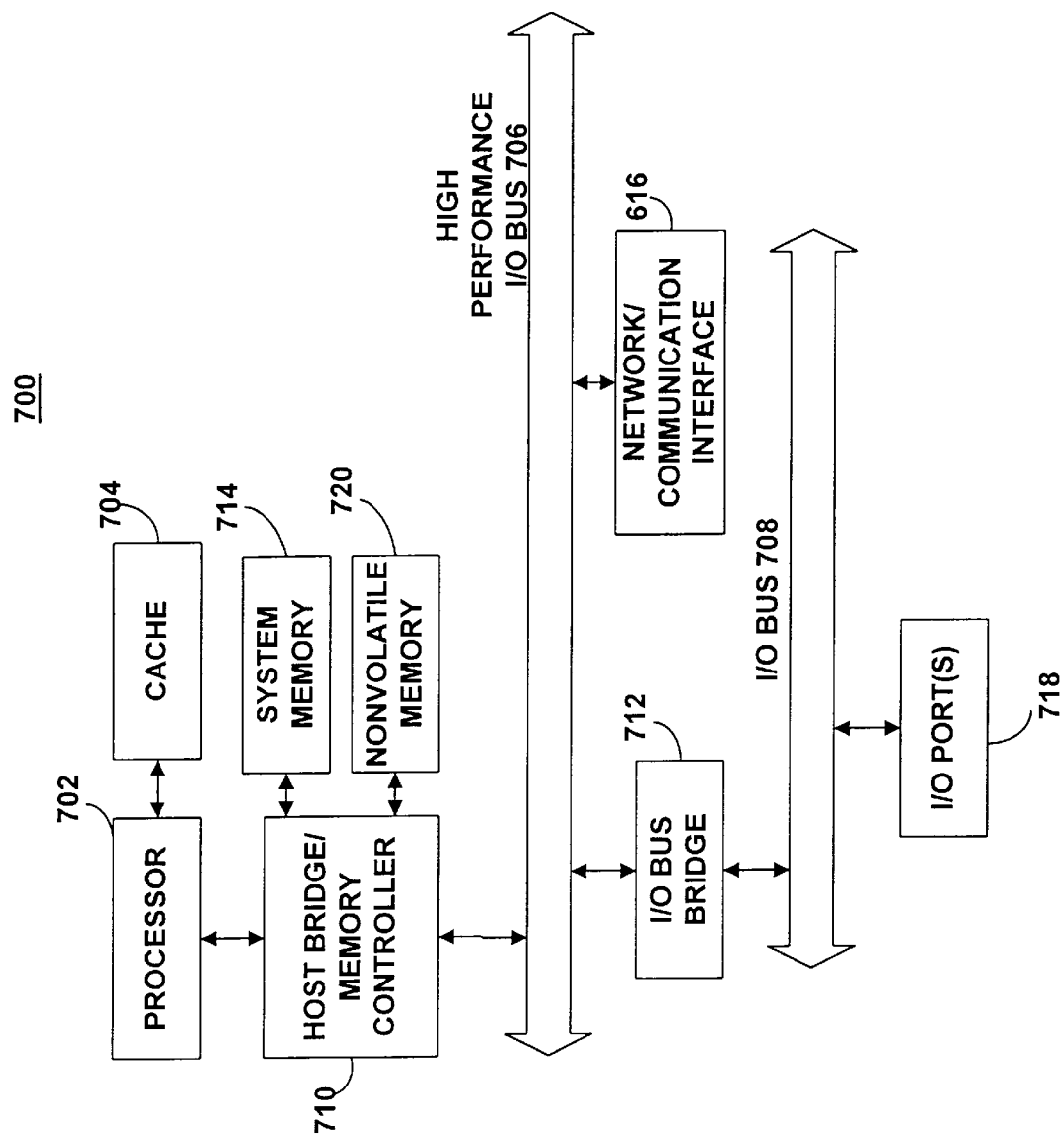
FIG. 7 illustrates an embodiment of a hardware system or machine on which one embodiment of the present invention can be practiced.

FIG. 7 illustrates an example of a hardware system or machine on which one embodiment of the present invention can be practiced. In one embodiment, software architecture 100 of FIG. 1 is implemented on a hardware system 700 of FIG. 7. According to one implementation, the hardware system 700 is an Instant Internet[100™] device available from Bay Networks, Inc. of Santa Clara, Calif.

In the illustrated embodiment, hardware system 700 includes processor 702, cache memory 704, host bridge/memory controller 710, system memory 714, and nonvolatile memory 720 coupled to each other as shown. Additionally, hardware system 700 includes high performance input/output (I/O) bus 706 and standard I/O bus 708. Host bridge/memory controller 710 couples processor 702 to high performance I/O bus 706, whereas I/O bus bridge 712 couples the two buses 706 and 708 to each other. Network/communication interface 716 is coupled to high performance I/O bus 706, and additional I/O ports 718 are coupled to I/O bus 708. I/O ports 718 are one or more serial and/or parallel communication ports used to provide communication between additional peripheral devices which may be coupled to hardware system 700. Collectively, these elements are intended to represent a broad category of hardware systems, including but not limited to the Instant Internet[100™] device, and general purpose computer systems based on processors available from Intel Corporation of Santa Clara, Calif., from Advance Micro Devices (AMD) of Sunnyvale, Calif., from National Semiconductor of Sunnyvale, Calif., or from Digital Equipment Corporation (DEC) of Maynard, Mass.

These elements 702–720 perform their conventional functions known in the art. In particular, network/communication interface 716 is used to provide communication between system 700 and any of a wide range of conventional networks, such as an Ethernet, token ring, the Internet, etc. It is to be appreciated that the circuitry of interface 716 is dependent on the type of network the system 700 is being coupled to. One or more additional network/communication interfaces (not shown) may also be coupled to high performance I/O bus 706 or standard I/O bus 708 for communicating with another network, such as the Internet.

According to the illustrated embodiment of the present invention, nonvolatile memory 720, such as an EEPROM or an erasable Flash ROM, provides permanent storage for data and programming instructions to perform the above described functions, whereas system memory 714 and cache memory 704 are used to provide temporary storage for the data and programming instructions when executed by processor 702. According to one implementation, system memory 714 is RAM 400 of FIG. 4 and nonvolatile memory 720 is Flash ROM 300 of FIG. 3.

It is to be appreciated that various components of hardware system 700 may be rearranged. For example, cache 704 may be on-chip with processor 702. Alternatively, cache 704 and processor 702 may be packaged together as a "processor module" and attached to a "processor card", with processor 702 being referred to as the "processor core". Furthermore, certain implementations of the present invention may not require nor include all of the above components. For example, cache 704 or I/O ports 718 may not be included in system 700. Additionally, the I/O ports 718 shown coupled to standard I/O bus 708 may be coupled to high performance I/O bus 706; in addition, in some implementations only a single bus may exist with the components of hardware system 700 being coupled to the single bus. Furthermore, additional components may be included in system 700, such as additional processors, mass storage devices, memories, video memories, display devices, keyboard devices, pointing devices, etc.

In alternate embodiments of the present invention, hardware system 700 is less complex than illustrated. By way of example, processor 702, system memory 714, and network/communication interface 724 could be implemented in a microcontroller or an application specific integrated circuit (ASIC).

In one embodiment, the methods of FIGS. 2 and 5 are implemented as a series of software routines comprising a plurality or series of instructions to be executed by processor 702 of hardware system 700. Initially, the series of instructions are stored on a storage device, such as nonvolatile memory 720. However, it is to be appreciated that the series of instructions can be stored on any conventional storage medium, such as a hard disk, removable diskette, CD-ROM, magnetic tape, DVD, laser disk, etc. It is also to be appreciated that the series of instructions need not be stored locally, and could be received from a remote storage device, such as a server on a network, via network/communication interface 716.

The instructions are copied from the storage device (or remote source) into memory 714 and then accessed and executed by processor 702. In one implementation, these software routines are written in the C++ programming language. It is to be appreciated, however, that these routines may be implemented in any of a wide variety of programming languages.

In alternate embodiments, the present invention is implemented in discrete hardware or firmware. For example, in one alternate embodiment, an application specific integrated circuit (ASIC) is programmed with the above described functions of the resent invention.

Thus, the present invention implements a 32-bit operating system which supports 16-bit code as well. The present invention advantageously allows the 32-bit operating system to communicate in a 32-bit mode with other 32-bit applications, and only requires a conversion to a 16-bit mode when communicating with 16-bit applications. Additionally, the present invention advantageously makes use of well-known operating systems (e.g., Microsoft™ DOS-compatible systems) during initialization, then frees that memory space for use by other data and/or applications.

In the discussions above, the present invention is described as implementing a 32-bit operating system which supports 16-bit code. It is to be appreciated, however, that the present invention is equally applicable to other embodiments using different-sized code. That is, implementations of an x-bit operating system which supports y-bit code, where x >y, are within the spirit and scope of the present invention.

According to one embodiment of the present invention, the Flash ROM 300 of FIG. 3 is a one megabyte Flash ROM and the RAM 400 of FIG. 4 is a four megabyte RAM. However, in alternate embodiments different sized memories are used, such as a two megabyte Flash ROM or a 16 megabyte RAM.

Thus, a method and apparatus for implementing a 32-bit operating system which supports 16-bit code has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising the steps of:
   loading basic input output system (BIOS) code into a base portion of a memory;
   loading first operating system code into the base portion;
   loading second operating system code into an extended portion of the memory; and
   allowing the second operating system code to overwrite the BIOS code and the first operating system code with data.

2. The method of claim 1, wherein the step of loading the second operating system code comprises the steps of:
   the first operating system code loading the second operating system code into the base portion of the memory;
   the first operating system code initiating execution of an operating system initialization program; and
   the operating system initialization program transferring the second operating system code into the extended portion of the memory.

3. The method of claim 1, further comprising the steps of:
   the second operating system code loading at least one terminate and stay resident (TSR) application code into the base portion of the memory; and
   the second operating system code loading network application code into the extended memory.

4. The method of claim 3, further comprising the steps of:
   executing the second operating system code and the network application code in a 32-bit protected mode; and
   executing the TSR code in a 16-bit protected mode.

5. The method of claim 4, further comprising the steps of:
   the second operating system receiving a plurality of system calls from the network application code, wherein a first set of the plurality of system calls are directed to the second operating system and a second set of the plurality of system calls are directed to the TSR code;
   the second operating system converting parameters corresponding to the second set of the plurality of system calls to a 16-bit protected mode format; and
   the second operating system transferring execution to the TSR code.

6. The method of claim 5, further comprising the steps of:
   the second operating system intercepting a return call from the TSR code;
   the second operating system converting parameters corresponding to the return call to a 32-bit protected mode format; and
   the second operating system transferring execution to the network application.

7. A machine-readable medium having stored thereon a plurality of instructions, designed to be executed by a processor, for implementing a function for loading basic input output system (BIOS) code into a base portion of a memory, for loading first operating system code into the base portion, for loading second operating system code into an extended portion of the memory, and for allowing the second operating system code to overwrite the BIOS code and the first operating system code with data.

8. The machine-readable medium of claim 7, wherein the plurality of instructions for implementing a function for loading the second operating system code comprises a plurality of instructions for implementing a function for the first operating system code loading the second operating system code into the base portion of the memory, for the first operating system code initiating execution of an operating system initialization program, and for the operating system initialization program transferring the second operating system code into the extended portion of the memory.

9. The machine-readable medium of claim 7, wherein the plurality of instructions are further for implementing a function for the second operating system code loading at least one terminate and stay resident (TSR) application code into the base portion of the memory, and for the second operating system code loading network application code into the extended memory.

10. The machine-readable medium of claim 9, wherein the plurality of instructions are further for implementing a function for executing the second operating system code and the network application code in a 32-bit protected mode, and for executing the TSR code in a 16-bit protected mode.

11. The machine-readable medium of claim 10, wherein the plurality of instructions are further for implementing a function for the second operating system receiving a plurality of system calls from the network application code, wherein a first set of the plurality of system calls are directed to the second operating system and a second set of the plurality of system calls are directed to the TSR code, for the second operating system converting parameters corresponding to the second set of the plurality of system calls to a 16-bit protected mode format, and for the second operating system transferring execution to the TSR code.

12. The machine-readable medium of claim 11, wherein the plurality of instructions are further for implementing a function for the second operating system intercepting a return call from the TSR code, for the second operating system converting parameters corresponding to the return call to a 32-bit protected mode format, and for the second operating system transferring execution to the network application.

13. An apparatus comprising:
   means for loading basic input output system (BIOS) code into a base portion of a memory;
   means for loading first operating system code into the base portion;
   means for loading second operating system code into an extended portion of the memory; and
   means for allowing the second operating system code to overwrite the BIOS code and the first operating system code with data.

14. The apparatus of claim 13, wherein the means for loading the second operating system code comprises:
   means for the first operating system code loading the second operating system code into the base portion of the memory;

means for the first operating system code initiating execution of an operating system initialization program; and means for the operating system initialization program transferring the second operating system code into the extended portion of the memory.

15. The apparatus of claim 13, further comprising:

means for the second operating system code loading at least one terminate and stay resident (TSR) application code into the base portion of the memory; and means for the second operating system code loading network application code into the extended memory.

16. The apparatus of claim 15, further comprising:

means for executing the second operating system code and the network application code in a 32-bit protected mode; and means for executing the TSR code in a 16-bit protected mode.

17. The apparatus of claim 16, further comprising:

means for the second operating system receiving a plurality of system calls from the network application code, wherein a first set of the plurality of system calls are directed to the second operating system and a second set of the plurality of system calls are directed to the TSR code;

means for the second operating system converting parameters corresponding to the second set of the plurality of system calls to a 16-bit protected mode format; and means for the second operating system transferring execution to the TSR code.

18. The apparatus of claim 17, further comprising:

means for the second operating system intercepting a return call from the TSR code;

means for the second operating system converting parameters corresponding to the return call to a 32-bit protected mode format; and means for the second operating system transferring execution to the network application.

* * * * *

UNITED STATES PATENT AND TRADEMARK OFFICE
CERTIFICATE OF CORRECTION

PATENT NO. : 5,968,174
DATED : October 19, 1999
INVENTOR(S) : Hughes It is certified that error appears in the above-identified patent and that said Letters Patent is hereby corrected as shown below:

In column 10, line 49, delete "resent" and insert -- present --.

Signed and Sealed this

Nineteenth Day of September, 2000

*Attest:*

Q. TODD DICKINSON

*Attesting Officer*   *Director of Patents and Trademarks*

UNITED STATES PATENT AND TRADEMARK OFFICE
CERTIFICATE OF CORRECTION

PATENT NO. : 5,968,174
DATED : October 19, 1999
INVENTOR(S) : Hughes

It is certified that error appears in the above-identified patent and that said Letters Patent is hereby corrected as shown below:

On title page, item [73], Assignee, delete "Bay Networkds, Inc." and insert -- Bay Networks, Inc.--.

Signed and Sealed this

Fifth Day of December, 2000

Attest:

Attesting Officer

Q. TODD DICKINSON
Director of Patents and Trademarks